Oct. 18, 1927.

E. G. DANN 1,645,589

SEGMENTAL SPRING BUMPER

Filed Dec. 14, 1922

INVENTOR.
Ernest G. Dann
BY
ATTORNEYS

Patented Oct. 18, 1927.

1,645,589

UNITED STATES PATENT OFFICE.

ERNEST G. DANN, OF CHICAGO, ILLINOIS, ASSIGNOR TO THE CLEVELAND GRAPHITE BRONZE COMPANY, OF CLEVELAND, OHIO, A CORPORATION OF OHIO.

SEGMENTAL SPRING BUMPER.

Application filed December 14, 1922. Serial No. 606,796.

This invention comprises an individual spring bumper adapted to be attached to the frame end of a motor vehicle. It relates more particularly to a bumper, preferably of segmental form, wherein a comparatively small portion of the end of the automobile is protected, a similar bumper being provided to protect another portion of the end. The bumper is particularly useful in protecting from injury the rear end of an automobile of the higher grade wherein a tire carrier of heavy construction is securely connected with the frame and, when equipped with a tire of large size, constitutes in itself a very effective central impact resisting medium.

Where bumpers of the usual type extending completely across the car are employed such bumpers have to be supported at a considerable distance from the car body. Such bumpers, when so supported, have a tendency to interfere with the spring action of the car causing a rocking action of the same when a rough road surface is encountered, and they also constitute a serious obstruction when it is necessary to change tires and remove the spare tire from its support and replace the injured tire upon the tire rack.

It is one of the objects of the present invention to provide a bumper which is adapted to be closely coupled to the rear end of the car and to permit free access to the spare tire at all times. The invention also eliminates much of the weight which would be necessary in a bumper of the usual type and permits the normal spring action of the car to be had under all conditions. It also permits the spare tire to act effectively as a buffer in the event of a direct rear end collision. Other objects of the invention will appear in the course of the following description. To the accomplishment of the foregoing and related ends, said invention, then, consists of the means hereinafter fully described and particularly pointed out in the claims.

The accompanying drawing and the following description set forth in detail certain mechanism embodying the invention, such disclosed means constituting, however, but one of various mechanical forms in which the principle of the invention may be used.

In said accompanying drawing:—

Figure 1:
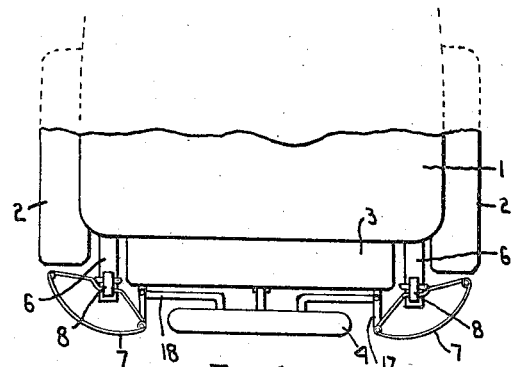
Figure 2:
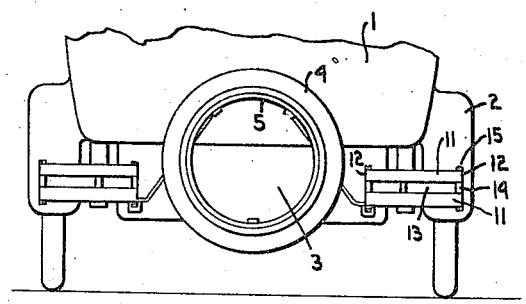
Figure 4:
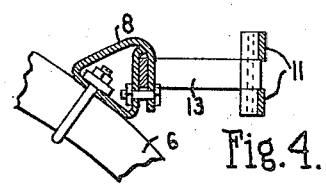
Figure 3:
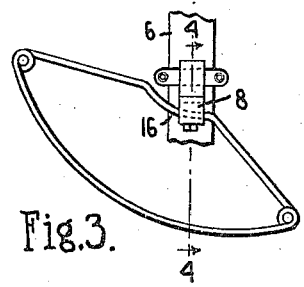
Figure 5:
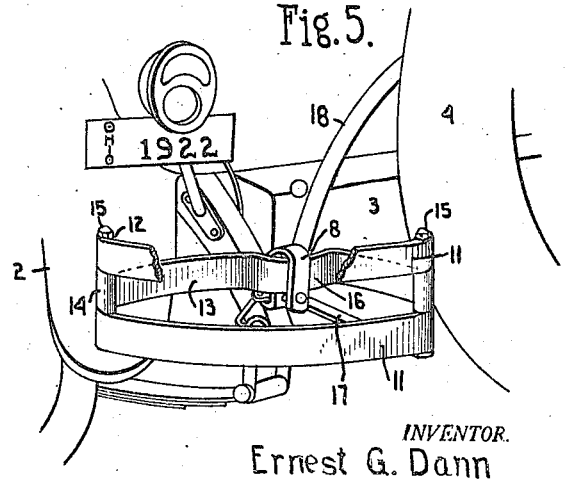

Fig. 1 is a top plan view of the rear end of an automobile showing the individual bumpers applied to the respective frame ends of the car; Fig. 2 is an elevation of the construction shown in Fig. 1; Fig. 3 is an enlarged detail plan view of an individual bumper of the type shown in Figs. 1 and 2; Fig. 4 is a transverse vertical section taken along the line 4—4 shown in Fig. 3, looking in the direction of the arrows; and Fig. 5 is a perspective view of one corner of the rear end of an automobile showing the manner in which the several parts of the same are protected from injury by means of the bumper, the upper impact bar of the bumper being broken away to better illustrate the construction.

As is clearly shown in the drawings, a motor car 1, having the usual fenders 2, gasoline tank 3, spare tire 4 and carrier 5, is provided adjacent the ends of its respective frame members 6, with individual bumpers 7, secured to said frame members by means of brackets 8. The details of the bracket structure are to form the subject matter of a companion application and will be further described only so far as is necessary in connection with the present invention.

The individual bumpers comprise each a pair of parallel impact bars 11 of segmental outline as viewed from above and provided at their ends with spring eyes 12, by means of which they are adapted to be positioned above and below a supporting bar 13 having similar spring eyes 14 at its ends through which bolts 15 are inserted, the complete structure constituting a "loop" which is of triangular or quadrant shape. The supporting bar is bowed forwardly from the impact bars and at an approximately central position is provided with a short substantially straight section 16 adapted to serve as the point of attachment of the bumper to the adjacent frame end by means of a bracket 8. It will be noted that the straight section of the supporting bar lies inwardly of the general outline of the bar and is merged with the end portions by means of gently curved sections. This construction of the supporting bar provides for a bumper of relative small size and light construction and yet having great resistance to impact.

In addition to the support afforded by the bracket, in many instances it is also desirable to connect one end of the bumper with a rigid member at the rear of the car by means of a strap or brace bar. Such brace bar 17, is shown in Figs. 1 and 5 of the drawing as connected with the frame member 18 of the tire carrier 5. Said bar is preferably a flat metal strip provided with apertures adjacent its ends, one of the apertures being seated over the inner end bolt 15 of the bumper and the other over the bottom fastening element of the tire carrier frame member 18.

By placing an individual bumper on each side of the spare or auxiliary tire at the rear end of the automobile adequate protection is afforded against damage to the car at points which are particularly exposed and where ordinarily the greatest amount of injury is done, especially in connection with the parking of cars in restricted parking spaces. The bumper protects the rear fenders, spring ends, gasoline tank, rear light and stop light, license bracket and similar accessories which are usually carried at the rear end of the car. Furthermore, the device adds greatly to the finished appearance of the automobile and in addition, has the great advantage of permitting easy access to the spare tire. It likewise relieves the car of excessive weight held at a distance from the point of support, as in the case of most rear bumpers of the standard type, and provides a pair of light bumpers having equal effectiveness as a protection to impact as the usual heavy bumpers and at the same time makes full use of the most excellent buffering capacity afforded by the usual auxiliary tire rigidly secured to the frame of the car. Where two or more auxiliary tires are carried at the rear of the car, the disadvantages of the usual type of bumper are greatly increased and the use of individual bumpers is practically the only method of adequately protecting the entire rear end of the automobile.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. A buffering apparatus adapted to be attached to the frame of a motor vehicle and comprising an auxiliary tire, a support therefor associated with the vehicle frame, and individual bumpers in the form of loops supported by their forward central portions directly upon the respective end portions of said frame, the outer faces of said individual bumpers being in alignment with the outer face of said auxiliary tire.

2. A bumper for the rear end of one side of a motor vehicle, comprising a separate substantially quadrant-shaped loop of resistant material positioned between the fender of the adjacent wheel and accessory structure projecting rearwardly centrally of the vehicle body, and means for rigidly securing said loop at its forward portion to the frame structure of said motor vehicle.

3. A bumper for the rear end of one side of a motor vehicle, comprising a separate substantially quadrant-shaped loop of resistant material positioned between the fender of the adjacent wheel and the accessory tire, and means for rigidly securing said loop at its forward portion to the frame structure of said motor vehicle.

4. A separate individual bumper for the end portion of the frame of a motor vehicle, comprising a pair of spaced parallel segmental impact bars formed of spring-metal strips, a supporting bar formed of like material, spring eyes provided at the ends of each of said bars, means for retaining the ends of said supporting bar between the ends of the spaced impact bars, and means for connecting the central portion of said supporting bar to the end portion of said frames.

5. An individual bumper for the frame ends of motor vehicles, comprising a pair of spaced parallel segmental impact bars formed of spring-metal strips, a supporting bar formed of like material, means for connecting the ends of said impact and supporting bars to each other, means for connecting the supporting bar to the frame of an automobile, and additional means for connecting the bumper with a rigid part of the automobile.

6. An individual bumper for the frame ends of motor vehicles, comprising a pair of spaced parallel segmental impact bars formed of spring-metal strips, a supporting bar formed of like material, means for connecting the ends of said impact and supporting bars to each other, means for connecting the supporting bar to the frame of an automobile, and a brace bar for connecting one end of the bumper with a rigid part of the automobile.

7. A buffering apparatus to be attached to the frame of a motor vehicle, comprising an auxiliary tire, a support therefor rigidly connected with the frame of the motor vehicle and individual bumpers in the form of loops supported by their forward central portions directly upon the respective end portions of said frame, said individual bumpers occupying the spaces at the rearward corners of the motor vehicle, respectively, between the auxiliary tire and the fenders over the rear wheels of said vehicle.

8. A vehicle having, in combination, a chassis frame, side fenders carried thereby, and a pair of wing bumpers supported by the frame in position to protect the fenders, each wing bumper consisting of a pair of vertically-spaced impact bars, and supporting means pivoted to both ends of the impact bars and secured to the frame.

9. In a rear bumper for automobiles, the combination of separate impact sections spaced apart to receive therebetween a spare tire or the like, said sections each comprising comparatively short, parallel, arc-shaped, resilient bars vertically spaced, and adapted to extend around the corners of the automobile, and means pivotally connected to the ends of said impact sections between said bars for securing said sections in place.

10. In a bumper for automobiles the combination of a spare tire so mounted as to afford an impact member and separate comparatively short impact bumper units spaced apart and positioned one at each rear corner of the automobile on either side of said first mentioned impact member, said impact member and bumper units being so positioned as to directly receive impacts from the rear corners and sides and to provide, in combination, without other means, a bumper throughout the width of the automobile which will permit the ready mounting and demounting of the spare tire.

11. In a rear bumper for automobiles the combination of two separate impact sections spaced apart, each section comprising a plurality of parallel bars adapted to extend around the rear corner of an automobile, and a bar spaced forwardly from each impact section and connected thereto at its ends, the forwardly spaced bars being adapted to be connected to the frame of an automobile.

12. A bumper to protect the rear fenders and spare tires at the rear ends of automobiles and consisting of a curved impact member having an eye at an end thereof, a supporting member for securing the bumper to the automobile frame, the said supporting member having an eye at one end thereof, and a bolt extending through the eyes on the impact and supporting members.

13. A triangular bumper to protect the rear fenders and spare tires at the rear ends of automobiles and consisting of a pair of curved resilient bars having eyes at the ends thereof, and supporting means for sustaining the said impact bars from the rear portion of an automobile frame, the said supporting means being provided with eyes, and bolts connecting the eyes on the supporting means to the eyes on the ends of the impact bars.

14. A triangular bumper to protect the rear fenders of an automobile and consisting of an impact member having its ends formed into eyes, supporting means extending from the ends of the impact member and adapted to be secured to the frame of an automobile, the said supporting means having outer ends formed into eyes, and pivot bolts connecting the eyes on the impact member with the eyes on the supporting means.

15. A triangular bumper for the rear corner of a vehicle, the said bumper comprising an impact section and a supporting section, the impact section comprising a pair of vertically spaced bars and the supporting section being connected at its ends to the impact section.

16. A triangular bumper for the rear corner of a vehicle, the said bumper comprising an impact section and a supporting section, the impact section comprising a pair of vertically spaced bars each having eyes at the ends thereof and the supporting section being provided with eyes at its ends connected to the eyes at the corresponding ends of the impact section.

17. Bumper means for protecting the rear corner portion of a vehicle comprising, in combination with the vehicle frame, impact receiving means including a pair of vertically spaced spring bars, and supporting means for said impact receiving means horizontally spaced between said bars and rigidly connected to said frame.

18. A bumper to protect the rear fenders and spare tires at the rear end of an automobile and consisting of vertically spaced curved impact members each having eyes at the ends thereof, and connecting means between the impact members and the rear end of such automobile, the said connecting means including eyes adapted to be secured to the eyes on the ends of the impact members.

Signed by me, this 5th day of December, 1922.

ERNEST G. DANN.